United States Patent
Schröder

(10) Patent No.: US 10,303,867 B2
(45) Date of Patent: May 28, 2019

(54) EXTERNAL SECURE UNIT

(71) Applicant: GIESECKE & DEVRIENT GMBH, Munich (DE)

(72) Inventor: Sönke Schröder, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 14/907,336

(22) PCT Filed: Jun. 18, 2014

(86) PCT No.: PCT/EP2014/001693
§ 371 (c)(1),
(2) Date: Jan. 25, 2016

(87) PCT Pub. No.: WO2015/010758
PCT Pub. Date: Jan. 29, 2015

(65) Prior Publication Data
US 2016/0171201 A1  Jun. 16, 2016

(30) Foreign Application Priority Data

Jul. 25, 2013 (DE) ........................ 10 2013 012 339

(51) Int. Cl.
*G06F 21/62* (2013.01)
*G06F 21/34* (2013.01)
(Continued)

(52) U.S. Cl.
CPC .............. *G06F 21/34* (2013.01); *G06F 21/32* (2013.01); *G06F 21/35* (2013.01); *H04B 5/0031* (2013.01);
(Continued)

(58) Field of Classification Search
CPC .................................................... G06F 13/368
See application file for complete search history.

(56) References Cited

U.S. PATENT DOCUMENTS 6,020,826 A * 2/2000 Rein ...................... G06K 19/04
                                                    235/380
6,308,270 B1 * 10/2001 Guthery ................ G06F 21/123
                                                    717/127
(Continued)

FOREIGN PATENT DOCUMENTS

DE       9320743 U1     2/1995
EP       2551788 A1     1/2013
(Continued)

OTHER PUBLICATIONS

German Search Report for corresponding German Application No. 102013012339.9, dated Jan. 28, 2014.
(Continued)

*Primary Examiner* — Josnel Jeudy
(74) *Attorney, Agent, or Firm* — Workman Nydegger

(57) ABSTRACT

A method for operating an external secure unit comprises at least a memory for storing data, a processor for processing the data, at least one interface for receiving data from a communication device or sending them thereto, wherein the communication device comprises at least a memory for storing at least one application program, a processor for processing and executing the application program, at least a first interface for sending data to the external secure unit or receiving them therefrom, at least a second interface for sending data to a transmission network or receiving them therefrom, wherein the method is wherein security-relevant data necessary for executing the application program in the communication device are stored in the external secure unit, and the communication device requests the security-relevant data from the external secure unit for executing the application program.

14 Claims, 5 Drawing Sheets

(51) Int. Cl.
*H04W 4/80* (2018.01)
*H04L 29/06* (2006.01)
*H04W 12/06* (2009.01)
*H04B 5/00* (2006.01)
*G06F 21/32* (2013.01)
*G06F 21/35* (2013.01)
*H04W 92/18* (2009.01)

(52) U.S. Cl.
CPC ....... *H04B 5/0081* (2013.01); *H04L 63/0853* (2013.01); *H04W 4/80* (2018.02); *H04W 12/06* (2013.01); *H04B 5/0062* (2013.01); *H04W 92/18* (2013.01)

(56) References Cited

U.S. PATENT DOCUMENTS

| | | | |
|---|---|---|---|
| 6,325,285 | B1 | 12/2001 | Baratelli |
| 6,825,751 | B1* | 11/2004 | Kita ................. G06K 19/07762 340/10.52 |
| 8,458,802 | B2* | 6/2013 | Baca ...................... G06F 21/10 713/189 |
| 9,811,644 | B1* | 11/2017 | Ahmed ................ G06F 21/105 |
| 2007/0009262 | A1* | 1/2007 | Perkins ............... H04J 14/0201 398/58 |
| 2009/0084846 | A1* | 4/2009 | Ashizaki ............ G06K 7/10178 235/451 |
| 2009/0125746 | A1* | 5/2009 | Rofougaran ............ H01L 23/66 713/400 |
| 2010/0031043 | A1* | 2/2010 | Burger .................... G06F 21/32 713/170 |
| 2010/0251387 | A1* | 9/2010 | Takeda .................... G06F 21/10 726/29 |
| 2011/0133894 | A1* | 6/2011 | Hennig ................... H02J 50/20 340/10.1 |
| 2012/0131350 | A1* | 5/2012 | Atherton ................. G06F 21/32 713/186 |

FOREIGN PATENT DOCUMENTS

| | | |
|---|---|---|
| EP | 2597723 A1 | 5/2013 |
| FR | 2945143 A1 | 11/2010 |
| WO | 2011006791 A1 | 1/2011 |
| WO | 2013034681 A1 | 3/2013 |
| WO | 2013089777 A1 | 6/2013 |
| WO | 2014186559 A2 | 11/2014 |

OTHER PUBLICATIONS

International Preliminary Report on Patentability for corresponding International PCT Application No. PCT/EP2014/001693, dated Jan. 26, 2016.
International Search Report for corresponding International PCT Application No. PCT/EP2014/001693, dated Oct. 6, 2014.
Wikipedia, "Chipkarte," URL: http://de.wikipedia.org/w/index.php?title=Chipkarte&oldid=117579417, downloaded on Jan. 27, 2014.

* cited by examiner

EXTERNAL SECURE UNIT

BACKGROUND

The present invention describes an external secure unit, its construction, manufacture and application.

From the prior art is known in particular a technology that enables mobile communication devices, e.g. mobile telephones, smartphones, tablet PCs, etc., to set up and carry out a communication connection with another communication partner via e.g. NFC. An application example thereof is an authentication and release of services in particular through identities stored in the mobile communication device, with so-called secure units, e.g. SIM cards, preferably being applied for storing identities. Further, corresponding applications with regard to RFID technology are also known from the prior art.

Identities, e.g. cryptologic keys or data for authentication for e.g. services on the Internet are stored either in a secure unit, e.g. a microSD, SIM or a Trusted Execution Environment TEE or in an unsecured memory of a mobile telephone. Upon loss of the mobile telephone or unauthorized access to a secure unit, in particular the data on the identity, key data, access data, etc., can be lost, spied out or employed without permission. To protect from abuse here, the above-mentioned data are as a rule protected with e.g. a password or a PIN. In particular PIN and password have the disadvantage that a user can only remember a limited number of different PIN and/or password combinations. The result is often that either the same password is always employed or only very simple passwords are employed. Both variants are very unsafe.

Furthermore, there is the possibility of secure units, such as smart cards or mobile telephones connected therewith, being forgotten or lost.

SUMMARY

The object of the invention is achieved by the independent claim. Advantageous embodiments are described in the dependent claims.

For achieving the object, the invention discloses a method for operating an external secure unit comprising at least
  a memory for storing data,
  a processor for processing the data,
  at least one interface for receiving data from a communication device or sending them thereto,
wherein the communication device comprises at least
  a memory for storing at least one application program,
  a processor for processing and executing the application program,
  at least a first interface for sending data to the external secure unit or receiving them therefrom,
  at least a second interface for sending data to a transmission network or receiving them therefrom,
wherein the method is characterized in that
security-relevant data necessary for executing the application program in the communication device are stored in the external secure unit, and the communication device requests the security-relevant data from the external secure unit for executing the application program. As an external secure element there can advantageously be employed e.g. a finger-ring, an M2M module, a SIM card, a chip card having a contactless and/or contact-type interface, etc. Further, there can advantageously be employed as a communication device e.g. a mobile telephone, smartphone, terminal for bank applications, notebook, etc.

An advantageous embodiment example of the invention is that the external secure unit is associated with an object to which the external secure unit is firmly connected.

A further advantageous embodiment example of the invention is that at least one application program is assigned a security level in dependence on its application.

A further advantageous embodiment example of the invention is that data are transferred contactlessly between the communication device and the external secure unit.

A further advantageous embodiment example of the invention is that the external secure unit employs at least two different contactless interfaces for sending or receiving data.

A further advantageous embodiment example of the invention is that the external secure unit employs as an interface an NFC interface for communication with the communication device. In this case the communication device likewise employs an NFC interface for communication.

A further advantageous embodiment example of the invention is that the external secure unit employs two- and/or three-dimensionally arranged antennas for communication with the communication device.

A further advantageous embodiment example of the invention is that the external secure unit employs a vibration element. Thus the external secure unit can generate a signal by means of vibration when e.g. a transaction has been successfully performed.

A further advantageous embodiment example of the invention is that the external secure unit employs a switch. The switch can be employed for example for switching between at least two operating modes.

A further advantageous embodiment example of the invention is that the external secure unit employs a display element in order to output e.g. a message to a user.

A further advantageous embodiment example of the invention is that the external secure unit employs at least one security feature for protection against forgery. The at least one security feature can be arranged e.g. on an outer area of the external secure unit. As a security feature there can be employed e.g. a known security feature from the bank-note printing sector which e.g. fluoresces.

A further advantageous embodiment example of the invention is that the external secure unit employs a sensor for capturing biometric features. This advantageously also allows e.g. fingerprints to be captured.

A further advantageous embodiment example of the invention is that the external secure unit employs a sensor in order to recognize finger veins. This has the advantage that the external secure unit can determine on the basis of the finger veins whether the user is authorized to e.g. execute an application.

A further advantageous embodiment example of the invention is that the external secure unit employs at least one processor. To increase computing power there can advantageously also be employed a plurality of processors.

A further advantageous embodiment example of the invention is that the external secure unit employs an energy storage device.

A further advantageous embodiment example of the invention is that the external secure unit is a finger-ring which consists of at least two components, with an electronic component being inserted into at least one component. This has the advantage that the external secure unit can be always taken along with one. It can thus not be forgotten e.g. at the workplace since it is always located on one's body.

A further advantageous embodiment example of the invention is that the finger-ring consists of a strip-shaped material, with the material being shaped into a ring.

A further advantageous embodiment example of the invention is that an NFC module is inserted into the ring, with the NFC module being replaceable.

A further advantageous embodiment example of the invention is that there is employed as an object a person or a thing. The external secure unit can therefore be advantageously configured as a finger-ring, so that persons can easily take it along with them. Another advantageous possibility is that the external secure unit is configured e.g. for automobiles as an M2M-SIM in order for it to be always firmly connectable to the automobile.

A further advantageous embodiment example of the invention is that there is employed as a communication device a mobile telephone.

A further advantageous embodiment example of the invention is that there is employed as a transmission system a mobile radio network.

For achieving the object, the invention further discloses an external secure unit which is configured to perform a method as described above.

For achieving the object, the invention further discloses a method for manufacturing an external secure unit which is configured to perform a method as described above.

For achieving the object, the invention further discloses a system which consists of at least one secure unit according to the above description and at least one communication device.

An advantageous embodiment example of the invention is that a mobile telephone is employed for the system as a communication device.

BRIEF DESCRIPTION OF THE DRAWINGS

Hereinafter the invention will be described in detail with reference to the attached figures.

DETAILED DESCRIPTION OF VARIOUS EMBODIMENTS

Figure 1:
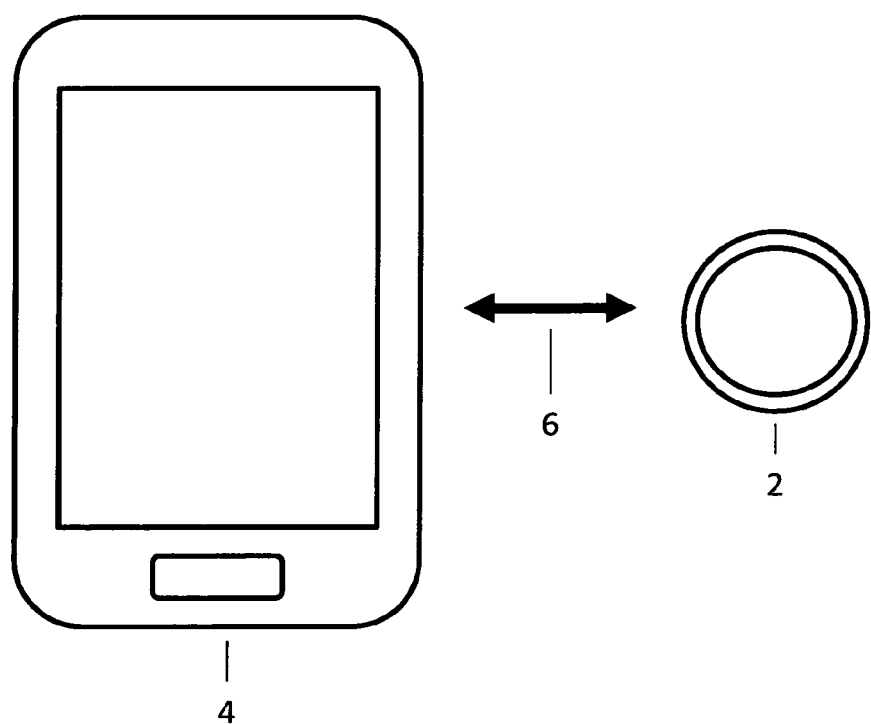
FIG. 1 shows the basic structure of the invention by the example of a finger-ring as an external secure unit and of a smartphone as a communication device.

FIG. 1 shows the basic structure of the invention by the example of a finger-ring 2 as an external secure unit 2 and of a smartphone as a communication device 4. The invention discloses a method for authentication by means of the finger-ring 2 and of the smartphone 4. The finger-ring 2 is worn by a user e.g. permanently on the finger. The user has the possibility of managing the data stored in the finger-ring 2 himself, e.g. by means of a web portal. The finger-ring 2 and the smartphone 4 are interconnected e.g. via a contactless communication connection 6, e.g. an NFC connection. The finger-ring 2 is connected to the smartphone 4 via a suitable application which is executed on the smartphone 4. The application on the smartphone 4 contains no security-relevant data. All security-relevant data that are necessary for executing applications on the smartphone 4 are stored only on the finger-ring 2. The finger-ring 2 supplies the required security-relevant data at the request of the smartphone 4. The finger-ring 2 has all necessary apparatuses, such as a processor with a memory and the suitable interfaces, e.g. an antenna coil 8, for setting up and operating a communication connection 6 with the smartphone 4. On the finger-ring 2 there are stored all security-relevant data such as identities for access to e.g. email, Facebook, Google, Twitter, Amazon, Internet services, banking, payment, transit, etc., as well as cryptologic keys, e.g. PKI, or access identities. The finger-ring 2 as an external secure unit 2 is advantageously so configured that it cannot be taken away or employed without authorization or get lost, since it is worn as a ring on the finger. An expedient communication connection 6 between finger-ring 2 and smartphone 4 is a contactless communication connection, e.g. an NFC connection. However, any other suitable communication technology is likewise possible.

Advantageously, in the smartphone 4 the applications present are grouped according to a security level. The lowest security level is used for example for Internet services or accesses without an additional password query, for which presentation of the external secure unit 2 is sufficient for identification. A higher security level is used e.g. for accesses that necessitate both the external secure unit 2 and a password as access e.g. to a company's PC. A high security level is used e.g. for services for banking or payment on the Internet, for which e.g. besides the external secure unit 2 there must be given a TAN number generated by the external secure unit 2. Depending on the security level of the application, a PIN or password query can e.g. take place additionally.

On the smartphone 4 is stored an application which communicates with the external secure unit 2 and retrieves necessary data from the external secure unit 2 via different, preferably contactless interfaces. Preferably, an encrypted data transfer 6 takes place between finger-ring 2 and smartphone 4.

An application associated with the external secure unit 2 can be started either directly from the menu of the smartphone or indirectly through another selected application which requires data from the external secure unit 2.

With the present invention a virtually arbitrary number of identities can be stored and managed in the external secure unit 2. Secure passwords can be employed without the user having to remember them. The smartphone 4 can for example be locked until the finger-ring 2 unlocks the smartphone 4 again. In particular the configuration of the external secure unit 2 as a finger-ring 2 results in simple handling for the user, since the smartphone 4 is located near the finger-ring 2 during utilization. Further, it is possible to also encrypt and secure all data stored on the smartphone 4, employing cryptologic methods.

Figure 2:
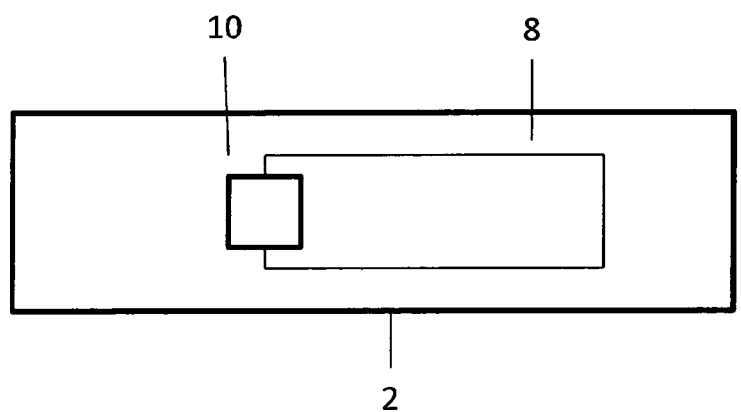
FIG. 2 shows a cross section through a ring according to the invention as an embodiment example of an external secure unit.

FIG. 2 shows a cross section through a finger-ring 2 according to the invention as an embodiment example of an external secure unit 2. In the finger-ring 2 are located an antenna coil 8 and a chip or a chip module 10, which are schematically indicated.

Smart cards can generally be easily forgotten or lost, and are a nuisance to a user due to their increasing number. Known finger-rings or wristbands with an RFID function are employed merely for identification, and not connected to further services. RFID wristbands and corresponding watches can be poorly employed for authentication with a communication device, since they are usually outside the range of an NFC reader. RFID rings or RFID tags with a conventional ring-shaped antenna can hardly be employed, since the coupling position of the antennas is very unfavorable between an RFID finger-ring and an RFID reader when employing a communication device, since the arrangement is orthogonal when the user holds the communication device in his hand.

Consequently, the above-mentioned problems with regard to range and coupling position are to be solved.

For solving these problems, the invention therefore proposes integrating into the external secure unit 2, e.g. the finger-ring 2, an antenna coil 8 for a first frequency, e.g. for an NFC application, as well as a chip module 10 which optionally also has an antenna coil for a second frequency, and electroconductively connecting the chip module 10 to the first antenna coil 8. Alternatively, further antenna coils for further frequencies can be present. The antenna coil 8 may be a ring-shaped antenna coil which is arranged in a lateral face of the finger-ring 2. Preferably, the antenna coil 8 is arranged in an underside of the finger-ring 2 to obtain a small distance from a communication device 4, e.g. smartphone. Further, the antenna coil 8 can be arranged orthogonally to the finger-ring 2. The antenna coil 8 can be configured as a Helmholtz antenna, with the appurtenant antenna coils being arranged opposingly in the lateral faces of the finger-ring 2. Preferably, the antenna coils of the Helmholtz antenna are arranged both on the side of the finger-ring 2 facing the user and on the side thereof facing away from the user. Another possibility is that the antenna coil 8 is arranged as a toroid antenna in the lateral face, preferably in a side of the finger-ring 2 facing away from the user. As a further alternative, the antenna coil 8 can also be configured as a dipole antenna. Optionally, a ferromagnetic element can be arranged in the antenna coil 8 to enhance the effect of the antenna coil 8. Further, it is possible that the antenna coil 8 for the first frequency is connected to the antenna coil for the second frequency on the chip module 10 in order e.g. to achieve an increase of range or to make available a transceiving antenna for another frequency. Further, an inductive coupling can be performed between the antennas for the first and second frequencies.

In general, the antenna coil 8 can be arranged at any angle to the outer side of the finger-ring 2. The antenna coil 8 can be arranged in the finger-ring 2 spatially both two- and three-dimensionally. Besides the antenna coil 8 at least one further antenna can be arranged in the finger-ring 2.

A plurality of antenna coils 8 arranged at an arbitrary angle, e.g. orthogonally, to each other improve a coupling between a reader and the respective antenna coil or coils 8. For example, two or three antenna coils 8 can be arranged orthogonally to each other.

Hereinafter will be described examples of two antenna coils 8 arranged orthogonally to each other. These are e.g. a ring-shaped antenna and a Helmholtz antenna which are arranged orthogonally to each other. Alternatively, a Helmholtz antenna can be arranged on the outer edges of the finger-ring 2, with a further Helmholtz antenna being arranged orthogonally thereto. Another example thereof is the arrangement consisting of a toroid antenna and a Helmholtz antenna arranged orthogonally thereto. A further example is a dipole antenna with a loop antenna arranged orthogonally thereto.

Examples of three antennas arranged orthogonally to each other will be described hereinafter. A first example is a ring-shaped antenna and two Helmholtz antennas in an orthogonal arrangement. A further example is a Helmholtz antenna which is arranged at the ends of the finger-ring 2 or on its outer edges, and two Helmholtz antennas in an orthogonal arrangement. Further, a toroid antenna and two Helmholtz antennas can also be arranged orthogonally to each other.

Furthermore, all other suitable combinations of the above-mentioned antenna forms are possible.

As described hereinabove, the range of the antenna coil 8 or antenna combination can be increased by combining at least one ferromagnetic element with the antenna coil 8.

The antenna coil 8 can optionally be tuned by means of capacitive elements.

A construction of three antenna coils 8 arranged orthogonally to each other is advantageous in that said construction can be employed in at least two coupling positions.

It holds in general that the antenna coil 8 or the antenna combinations are electrically connected to the chip module 10 in parallel or in series. Advantageously, the chip module 10 has an electronic circuit which respectively selects the antenna coil 8 with the best coupling position relative to a current reader. Further, the chip module 10 has an electronic circuit in order to discriminate antenna coils 8 with opposite coupling or to reverse their polarity, where applicable, e.g. by means of a rectifier in order to obtain an amplification of the coupling.

The great advantage of the above-described measures is that the finger-ring 2 can be recognized in the field of a reader independently of its location in space.

In order that the finger-ring 2 or, in general, the external secure unit 2 reaches a higher and/or a more secure data transfer rate and/or a greater range relative to a reader, it is proposed that the external secure unit 2, or here the finger-ring 2, has and employs a plurality of interfaces for data transfer.

For example, the power supply to an NFC finger-ring 2 and possibly also the initial detection thereof is effected as usual via an electromagnetic field of a reader. To obtain a higher data throughput and prevent or considerably impede tampering through a man-in-the-middle attack, the following data exchange is to be effected e.g. via an infrared diode integrated in the finger-ring 2 as well as in the reader. The infrared diode must, where applicable, be connected to the chip module 10 by means of an electronic circuit. A protocol switch-over from NFC to an infrared transfer is effected e.g. by means of NFC when a reader and an NFC finger-ring 2 support this. Alternative contactless interfaces are e.g. NFC, wireless LAN, Bluetooth, ZigBee, UHF, etc., whereby the chip module 10 must support the respective protocol. Further, an accordingly suitable antenna coil 8 must be integrated into the finger-ring 2 or the external secure unit 2. As an alternative to the contactless interfaces, there can be located on the surface of the finger-ring 2 contact-type interfaces, e.g. according to ISO 7816, SPI, USB, etc.

Further, by integrating interfaces that are not supported by the communication device 4 into the finger-ring 2 one can extend a range of functions of the communication device 4. Therefore, a communication runs from the communication device 4 via the finger-ring 2 with the corresponding interface to the device with the corresponding opposing interface and back.

This is advantageous in that man-in-the-middle attacks can be effectively prevented. The data transfer can be increased by a parallel employment of at least two interfaces. Further, it is possible to supply further or alternative interfaces for an application-specific employment. Further, the number and technical variety of the available interfaces of a communication device 4, e.g. of a smartphone, can be extended.

To give the user of the external secure unit 2, e.g. in the form of the finger-ring 2, a tactile feedback, e.g. a confirmation, about an action of the external secure unit 2, it is possible to integrate a vibration element in the external secure unit 2, or here in the finger-ring 2. The vibration element is for this purpose connected electroconductively to the chip module 10. The vibration element can be arranged either in the external secure unit 2, here in the finger-ring 2, or on the chip module 10. The energy supply is effected via an electromagnetic field of a reader in whose field the external secure unit 2 is located.

Hereinafter will be described some application examples of the vibration element.

At the beginning of an activation of the external secure unit 2 the vibration element is e.g. to vibrate once. This can be for example at the time of initial operation when an electromagnetic field of a reader is present. At the end of an activation the vibration element is to generate, a second time, a signal that is different, where applicable, e.g. two short pulses. Further, a further short pulse can be generated e.g. upon a changed display of a terminal. The use of the vibration element is expedient for example for longer-lasting actions, such as a cash payout at a terminal or for mobile banking or mobile payment.

For fast actions, e.g. in the transit area or for admission without a terminal menu, a single sequence of short pulses, e.g. three short vibration pulses, is for example sufficient.

The respective applications or, where applicable, also their states, e.g. error, confirmation, etc., can be assigned different or user-individual vibration pulses.

Further, a feedback of a code for verification or as a one-time password OTP or as a PIN for actions can be outputted by means of a pulse sequence, e.g. three short, one long, two short, two long, etc.

Since a user wears the external secure unit 2, e.g. the finger-ring 2, directly on his body, he recognizes directly when an action e.g. is performed or has ended. In addition, different actions can be distinguished on the basis of different vibration pulses. In particular for transit applications, i.e. applications without high security but requiring speed, the method has its advantages through the high user-friendliness in particular in comparison to smart cards.

To change a function of an external secure unit 2, e.g. a finger-ring 2, an actuating element, e.g. a switch or a sensing device, is integrated into the external secure unit 2. The actuating element is preferably arranged on the surface of the external secure unit 2. The actuating element is connected electroconductively to the chip module 10. With the actuating element, a connection between the chip module 10 and the antenna coil 8 can for example be interrupted. Another possibility is that the actuating element changes a tuning of the antenna to a certain frequency such that no function in the antenna's original frequency is possible any longer. A further possible employment of the at least one actuating element is that a switch-over between at least two chips on a module or between at least two chip modules 10 is effected by means of the actuating element. The individual chips or chip modules 10 are associated here with separate employments, e.g. private, job, transit, payment, authentication, etc. The individual chips or chip modules 10 are so linked with the actuating element here that only one chip or chip module 10 is ever connected to at least one antenna coil 8 while all other chips or chip modules 10 are not connected to the antenna coil 8. For example, the actuating element can have three switching stages. In the first switching stage, no chip is connected to the antenna coil 8 and no function of chip module 10 and antenna coil 8 is present. In a second switching stage, a chip or a chip module 10 is connected to the antenna coil 8 e.g. specifically for a payment function. This requires high security, and a processing of data takes an accordingly long time. In a third switching position, a chip or chip module 10 is connected to the antenna coil 8 specifically for a transit application, which requires high speed and low security. A further possible application of the actuating element is that the actuating element influences an operating system of the chip module 10 in order e.g. to change an adjusted security level. An actuating element in the form of a sensing device has for example capacitive areas which are arranged e.g. on an inner and outer side of the external secure unit 2 in the form of a finger-ring 2 and are so dimensioned that a desired antenna frequency is obtained, and a function of the actuating element enabled, when the finger-ring 2 is worn or when the finger-ring 2 is touched from outside. If the finger-ring 2 is not worn on a user's finger, then the antenna frequency is not right for the actuating element, so that a function is not given. Further, the actuating element can be a combination of at least one mechanical and at least one capacitive actuating element, e.g. a switch or sensing device. The advantage of an actuating element is that an unwanted or illegal detection of an external secure unit 2, e.g. of a finger-ring 2, is prevented. Further, different operating modes can be adjusted using the actuating element.

A further embodiment example of the external secure unit 2 is that a secure optical display unit can be integrated in the external secure unit 2. For example, the optical display unit can be realized by means of at least one light-emitting diode. The at least one light-emitting diode can render different operating modes. When an electromagnetic field of a reader is present, then a light-emitting diode can e.g. be lit green. When an operation is terminated, then a light-emitting diode can be lit red or flash. Flashing of a light-emitting diode can be used to represent a code, e.g. a random number from 1 to 10. A code can also be represented by multicolored flashing of e.g. red and green. For displaying a color code a plurality of light-emitting diodes can be employed, with the color code representing e.g. a password or a one-time password OTP, e.g. by means of a sequence of colors such as red, green, blue, blue, red, green. The displayed code can also be application-specific, e.g. for payment applications a light-emitting diode is lit green, for transit red, for an admission yellow, etc. Besides a light-emitting diode as a display unit there can also be employed an optical display for letters, numbers and symbols. With said optical display there can be displayed e.g. OTPs, PIN numbers, hash values, random numbers, payment amounts, contents of an electronic purse, etc.

Figure 3:
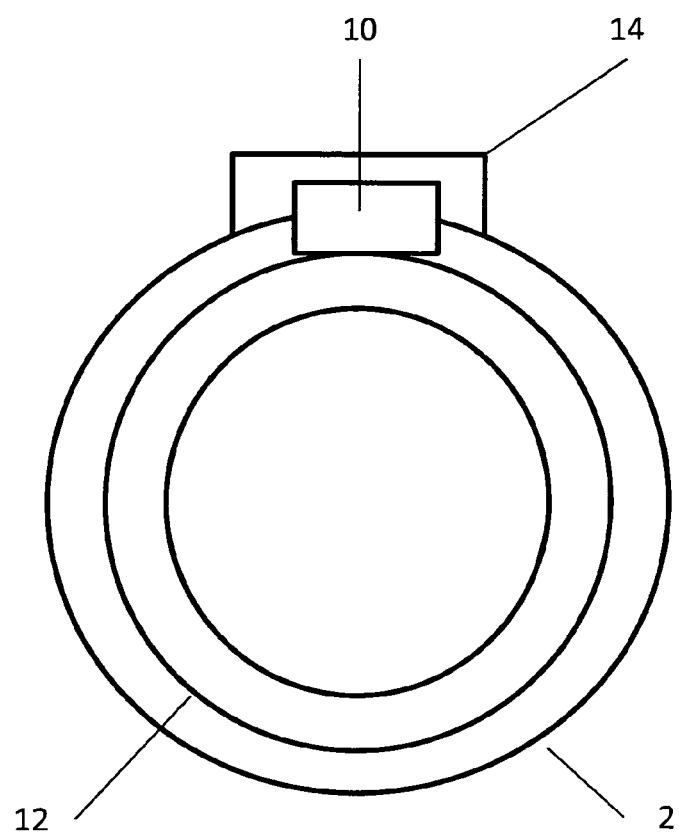
FIG. 3 shows a finger-ring according to the invention having an insertable chip module with a cover.

FIG. 3 shows a cross section through an external secure unit 2 in the form of a finger-ring 2 with a replaceable chip module 10. In the interior of the finger-ring 2 is arranged an inlay 12. The inlay 12 serves as a carrier for at least one antenna coil 8. The chip module 10 is inserted into a recess of the finger-ring 2. The position of the recess on the finger-ring 2 is arbitrary. The chip module 10 is protected against external influences by a cover 14. The cover 14 is e.g. a hinged cover or a cover that is connected e.g. by means of a thread to the finger-ring 2. The chip module 10 is electroconductively connected by means of electroconductive contacts to the at least one antenna coil 8 which is located on the inlay 12. The inlay 12 can be configured as a closed ring, as represented in FIG. 3, or as an open ring on whose surface e.g. an antenna coil 8 is arranged. The chip module 10 is arranged in particular replaceably in the finger-ring 2. Alternatively, the chip module 10 can also be firmly connected to the finger-ring 2. Advantageously, the chip module 10 is located in a module holder, in order that the contacts of the chip module 10 are properly interconnected to the contacts of a corresponding antenna coil 8. As a format for a chip module 10 there can be used for example an MFF1, MFF2, 4FF module or a microSD format or any other suitable format. Alternatively, there can also be employed conventional modules for contactless communication which e.g. already have an antenna coil 8 integrated on the chip module 10. Alternatively, it is possible to connect the chip module 10 permanently to the contacts of the inlay 12, e.g. by soldering, crimping, gluing, etc. If the chip module 10 is to be exchanged, then a spring can advantageously be integrated in the recess of the finger-ring 2 for the chip module 10 in order either to facilitate a later exchange and/or to urge the contacts of the chip module 10 onto the contacts of the inlay 12. Besides an electroconductive connection, the chip module 10 can also be connected by means of an inductive connection to the antenna coil 8 which is located on the inlay 12. Furthermore, the contacting between chip module 10 and antenna coil 8 can be effected capacitively.

In a further embodiment example, the external secure unit 2 has at least one security feature as protection against forgery. The external secure unit 2, e.g. a finger-ring 2, has security elements for example incorporated into the surface, applied thereto or integrated therein, such as holograms, Kinegrams, security threads, microprint, guilloches, fluorescent or phosphorescent inks, optically variable inks, color gradations, e.g. gradients, iridescent print, intaglio print, transparent regions, e.g. windows, etc. Depending on the manufacturing method for the external secure unit 2, the security features can be applied or incorporated during manufacture, e.g. window, hologram, security thread, etc., or later, e.g. by printing. Microstructures, e.g. microprint, guilloches, can be produced by rolling e.g. the finger-ring 2 as an external secure unit 2 against an area furnished with microstructures. The finger-ring 2 is held on a rotatable axle and urged against the area with pressure while being rolled. A plurality of finger-rings 2 can be arranged on an axle side by side. Either the finger-ring 2 can be rolled over the area or the area over the finger-ring 2. The area can also be a curved area. The area can optionally be heated. Depending on the form of the finger-ring 2, the area must have a corresponding form. Holograms or Kinegrams can be transferred e.g. by rolling the finger-ring 2 against a roll bearing the hologram. The hologram is thereby urged into the finger-ring 2 with pressure while employing heat and suitable glue. The hologram must previously be arranged on the roll or be transferred from a carrier foil to the finger-ring 2.

In a further embodiment example of the invention, the external secure unit 2 has a biometric sensor. This enables the user of the external secure unit 2 to authenticate himself. For example, the finger-ring 2 as an external secure unit 2 can have integrated therein at least one biometric sensor. The biometric sensor is connected suitably to the chip module 10. The sensor can be arranged on the chip module 10 or it can be arranged in the finger-ring 2 separately from the chip module 10 e.g. on a separate circuit foil. The biometric sensor can be integrated into the finger-ring 2 e.g. such that the biometric sensor captures e.g. at least a partial vein image in the finger while the finger-ring 2 is being pushed over a finger. As biometric sensors there can be employed e.g. at least one infrared diode and at least one infrared sensor. The infrared diode and the infrared sensor are arranged e.g. opposite each other such that e.g. an finger bone located therebetween has no adverse effect on a measuring result. Upon a first capture e.g. of a vein image of the ring finger, the vein image must be captured along the whole finger length from all possible angles in order to enable a later authentication of the user to be carried out from arbitrary angles upon arbitrary displacements along the finger. The first capture can be effected by means of the at least one biometric sensor of the finger-ring 2 or by means of an external biometric sensor. After the first capture the captured biometric data must be stored in the chip module 10 of the finger-ring 2 as an external secure unit 2. This can be done e.g. upon a personalization of the external secure unit 2, i.e. here of the finger-ring 2. Upon an authentication of the user, the captured biometric data are compared with the stored data. If the comparison yields a match of the captured data with the stored data, the user is authenticated. Upon comparison of the captured with the stored biometric data, either the complete captured data can be compared with the stored data, or only certain characteristic points of the captured data can be compared with the stored data. The characteristic data may be e.g. intersection points of veins or other unusual features. Further, a tolerance can additionally be established with regard to a position of the features or to a lightness difference relative to a captured background. The characteristic data are advantage in that less memory space is required in the chip module 10. Alternatively, a fingerprint e.g. of one finger can also be captured.

An advantageous application example of an external secure unit 2 with a biometric sensor will be described hereinafter. Instead of authenticating himself by a customer card at a bank terminal in order for example to withdraw cash or carry out another transaction, there is the possibility of a user authenticating himself at the terminal with an external secure unit 2 e.g. with a biometric sensor, e.g. with the above-described finger-ring 2 with a biometric sensor. Between terminal and finger-ring 2 there takes place for example a contactless communication, e.g. by NFC, which is preferably encrypted. The user of the finger-ring 2 authenticates himself by means of the biometric data stored in the finger-ring 2. The terminal compares the biometric data received from the finger-ring 2, e.g. the data of finger veins, with the data stored in a background system and authorizes e.g. a transaction in dependence on the comparison. Alternatively, it is possible that the terminal contains a reader for biometric data. The user's biometric data captured by the reader, e.g. a fingerprint, are transferred to the finger-ring 2. In the finger-ring 2 the comparison between the captured and stored data then takes place. In dependence on the result of the comparison the finger-ring 2 outputs a signal to the terminal e.g. about an authorization of a transaction. The proposed method is advantageous in that it is very user-friendly, since no smart card has to be taken along or can be forgotten at the terminal, since the external secure unit 2 is continually worn on the body, e.g. on the finger. Further, an authentication at the terminal is possible even when the terminal has no connection to a background system.

A further advantageous embodiment example of the invention describes a chip module 10 which has at least two physically mutually separate processors with the respectively appurtenant memory areas. The individual processors with their appurtenant memories can either be located respectively on a separate chip, or all processors with their appurtenant memories are located on one chip, with each processor and memory utilizing a separate region on the chip. This has the advantage that the respective processors and appurtenant memory areas can be adapted to the respective application, in particular with regard to required speed and security. For example, a chip module 10 can have optimized regions with respective regard to a dual SIM application, payment application or transit application. Each application is respectively assigned a processor, with each processor having its own memory, whereby the memories may differ in memory size. The respective processors are connected to their external environment by means of conventional contacts or interfaces, e.g. according to ISO 7816 or according to SPI. Each processor or its application can have its own security level. In a further embodiment example, the processor with the highest security level respectively performs a master function. All other processors with a lower security level perform a slave function. Each processor and appurtenant memories are e.g. respectively arranged on a separate chip. The individual chips are interconnected for example by means of a bonding wire. Alternatively, the chips can also be arranged one above the other so as to realize a connection between the individual chips by means of a feedthrough. A feedthrough to an external interface is preferably effected via the master, since it has the highest security level as a rule. The selection of the individual chips or their applications is effected via the master, which has a corresponding application. Alternatively, the selection of the individual chips can also be effected via a protocol. As a further alternative, each chip has its own external contacts, i.e. each chip or its application can be directly selected from outside without first going through the master. The individual chips are glued together during manufacture. Advantageously, the chips can be ground before gluing in order to obtain a lower overall height. Like and different chips can be glued together. Each chip can have located thereon besides its own application its own operating system. Alternatively, it is possible that at least two chips execute the same application. This can be utilized in particular for security-critical applications where high failure safety is required, such as with airplanes. This means for example that if a chip is defective, another still functioning chip can drive a system into a safe state. Further, the individual chips can check each other by means of their connections, in order e.g. to guarantee safe operation or e.g. to thwart or at least impede attacks on a chip.

In a further embodiment example, the external secure unit 2 has an energy storage device, e.g. an accumulator or a battery. The energy storage device is connected to the chip module 10 in order to supply the chip module 10 with energy outside an electromagnetic field of a reader. Within the reader's field the energy of the energy storage device can be additionally employed in order to increase the range of the antenna coil 8 upon transmission. The energy storage device is preferably charged by means of the reader's electromagnetic field. The energy storage device can also be employed to operate alternative communication channels, such as wireless LAN, infrared, etc., which are likewise supported by the chip module 10, outside the reader's field. Further, the energy storage device can be employed for operating electronic components, such as display units or display elements, and supplying them with energy. The energy storage device further enables uninterrupted operation of the processor after leaving the reader's field. The energy storage device can, for charging, be connected directly to the antenna coil 8 via a rectifier circuit, with the chip module 10 connecting the energy storage device to the antenna coil 8 accordingly by means of a suitable connection device.

FIGS. 4 to 10 describe, by way of example, possible construction variants of an external secure unit 2 in the form of a finger-ring 2.

Figure 4:
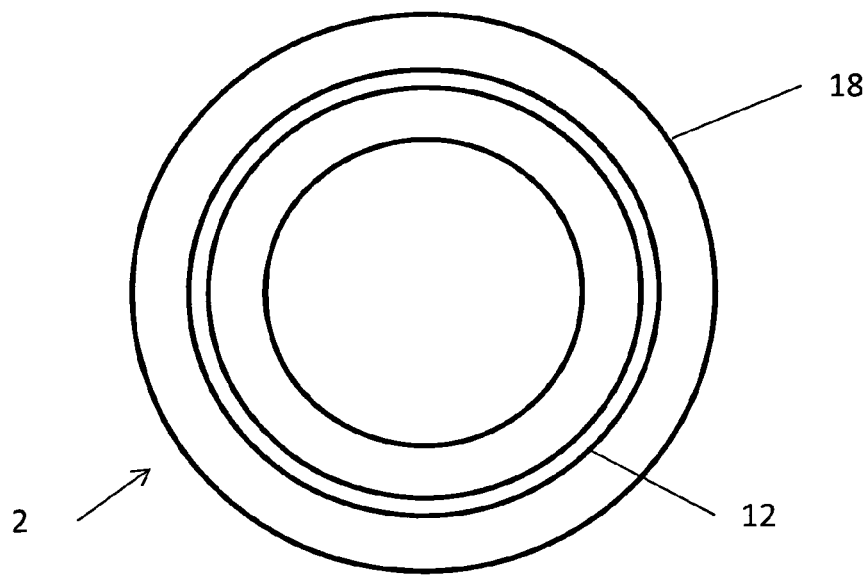
FIG. 4 shows a longitudinal section through a finger-ring as an example of an external secure unit.
Figure 5:
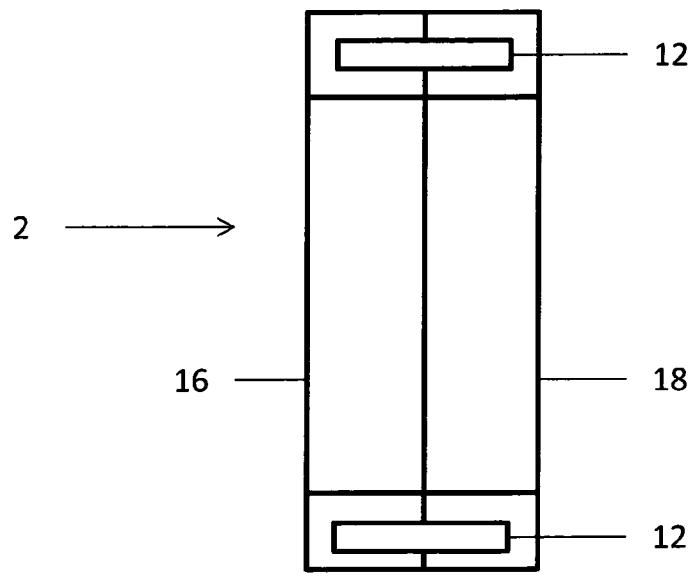
FIG. 5 shows a cross section, corresponding to FIG. 4, of the finger-ring.

FIG. 4 shows a longitudinal section through a finger-ring 2. Here, an inlay 12 is inserted into one half 18 of the finger-ring 2. FIG. 5 shows a cross section, corresponding to FIG. 4, of the finger-ring 2. The finger-ring 2 consists of two ring halves 16 and 18. The two ring halves 16 and 18 respectively have a recess into which the inlay 12 is inserted.

The finger-ring 2 consists in principle of at least one component 16, 18 into which at least one inlay 12 is inserted, whereby one component can be a ring half 16, 18. The components 16 and 18 are manufactured by a suitable technology, e.g. casting, milling, embossing. An expedient material for the components 16, 18 is plastic or metal. The components 16 and 18 are therefore simple, fast and inexpensive to manufacture. Further, the components can be simply adapted to different dimensions and accordingly manufactured. The components 16, 18 of the finger-ring 2 are interconnected by a suitable technology, e.g. by plugging, gluing, screwing, crimping, etc. Advantageously, the components 16, 18 are so connected that the connection between the components 16, 18 can be undone again in order e.g. to insert a further inlay 12 or to exchange an inlay 12, e.g. because it is defective. The inlay 12 is for this purpose inserted into at least one recess provided therefor within at least one component 14, 16. The inlay 12 itself consists of a preferably flexible carrier material, e.g. PET, Kapton, etc. On the carrier material there is arranged at least one antenna coil 8 and at least one chip module 10, with the antenna coil 8 being connected to the chip module 10. The antenna coil 8 can be suitable e.g. for an NFC communication. The antenna coil 8 can optionally contain a ferrite element to increase range. The antenna coil 8 is applied to the carrier by a suitable technology, e.g. by a printing technique, a wire-laying technique, an etching technique, a milling technique. The chip module 10 is connected to the antenna coil 8 by means of a suitable technology, e.g. by soldering, gluing, crimping. Besides the chip module 10, at least one further electronic component can also be located on the carrier, e.g. a display unit or a further antenna coil 8.

Figure 6:
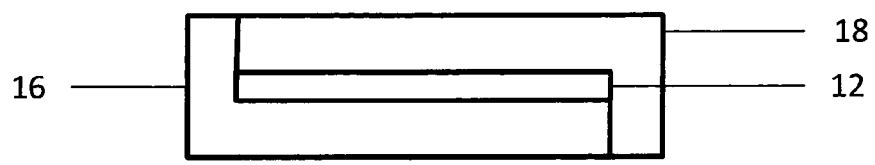
FIGS. 6 to 10 show different cross sections through a finger-ring.
Figure 7:
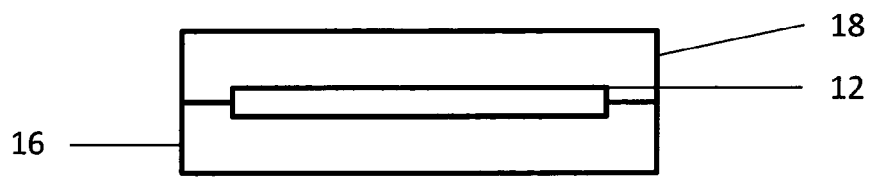
Figure 8:
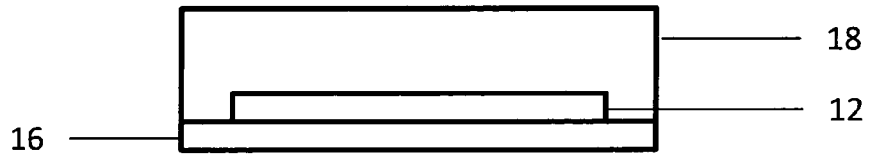
Figure 9:
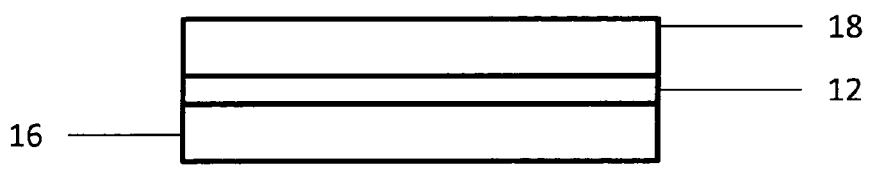
Figure 10:
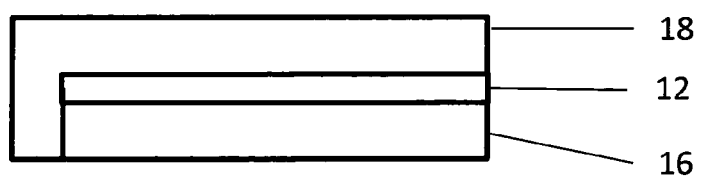

FIGS. 6 to 10 show different cross sections through a finger-ring 2, consisting of ring-shaped components 16, 18 of the finger-ring 2 and of an inlay 12. FIG. 6 shows a cross section with the components 14 and 16 having an L-shaped profile. Between the two L-shaped components 16 and 18 an inlay 12 is arranged. FIG. 7 accordingly shows two U-shaped components 16 and 18 between which an inlay 12 is arranged. FIG. 8 shows a U-shaped component 18 and an even component 16, with the inlay 12 being arranged between the components 16 and 18. FIG. 9 shows two even components 16 and 18 between which the inlay 12 is arranged. FIG. 10 shows an L-shaped component 18 and an even component 16 between which the inlay 12 is arranged.

The components 16, 18 of the finger-ring 2 can be manufactured from like or different materials. Materials that can be used are e.g. plastic or carbon, with at least one ferrite element having a suitable structure and form optionally being arranged between the components 16 and 18.

In the finger-ring 2 as an external secure unit 2 there can be arranged at least one inlay 12. The inlay 12 can have at least one chip module 10 with at least one antenna coil 8, with at least one further electronic device, e.g. a display, optionally being arranged on the inlay 12.

Optionally, the finger-ring 2 can have an interruption, so that the finger-ring 2 is not closed.

It is advantageous that the finger-ring 2 can be manufactured in different dimensions, in particular diameters, without the antenna coil 8 or the chip module 10 having to be adapted to the changed dimensions which influence the antenna frequency.

It is advantageous that the frequency of the antenna coil 8 is independent of the dimensions of the finger-ring 2. The antenna coil 8 is located on the carrier which is inserted both into a small and into a large finger-ring 2. A change of the dimensions of the finger-ring 2 therefore has no influence on the carrier, in particular the antenna coil 8, because the carrier always stays the same and only the dimensions of the finger-ring 2 change, so that the frequency of the antenna coil 8 always stays the same with both small and large finger-rings 2.

For manufacturing an external secure unit 2 in the form of a finger-ring 2 there is proposed a method that enables finger-rings 2 to be manufactured in arbitrary size from a flexible material. The finger-ring 2 may have for example an NFC functionality, as described above. However, all other contactless communication technologies are likewise possible.

There are applied to a carrier foil at least one chip module 10 and at least one antenna coil 8 and optionally further electronic devices, e.g. a further antenna coil 8 or a display. The antenna coil 8 can for example be printed on the carrier foil by means of a conductive paste. Advantageously, a depression is manufactured in the carrier foil, e.g. by milling, lasering, etching, before the chip module 10, the antenna coil 8 and optional further electronic devices are inserted into the depression. The depression has the purpose that the devices to be inserted into the depression should not protrude beyond the carrier foil if possible, so that an even surface is present on the carrier foil to facilitate a later processing of the carrier foil with inserted devices. The carrier foil itself consists of a flexible plastic material, e.g. PET or Kapton. The carrier foil consists of at least one foil. A strip-shaped ring blank is singled out of the carrier foil, e.g. by punching, lasering. Alternatively, it is possible that a ring blank is first singled out of a carrier foil, a depression is formed in said blank, and then the devices are inserted into the depression. Advantageously, a plurality of depressions for the later ring blanks are formed in a foil sheet, the devices are inserted into the depressions and finally the ring blanks with the inserted devices are singled out of the carrier foil. Further, a manufacture of ring blanks is accordingly also possible by a roll-to-roll process.

At least one further foil can be applied to the carrier foil or the ring blank on at least one side. A multilayer foil composite can therefore be produced. The foils can be interconnected e.g. by means of glue or lamination.

Alternatively, it is possible that not only at least two foils are arranged one above the other, but rather that at least two foils are arranged one behind the other and interconnected e.g. at their end faces, e.g. by means of glue, with the glue being UV-activatable or thermally activatable.

The carrier foil and the at least one further foil can be light-transmissive or light-non-transmissive.

Further, at least one foil can be at least partly printed by a suitable method, e.g. by laser printing, screen printing, offset printing.

As described above, the ring blanks are punched out of the carrier foil after completion of the above-described working steps. In dependence on the diameter of a finger-ring 2 to be manufactured, the ring blanks are singled, e.g. punched out, in a corresponding length. A further possible factor that influences the length of the ring blank is a planned thickness of the finger-ring 2 to be manufactured, i.e. the thicker the finger-ring 2 is to be, the greater the length of the ring blank must be.

It is essential to the invention that independently of the length of the respectively singled ring blank the length of the region in the carrier foil with the chip module 10, the antenna coil 8 and any further electronic devices stays the same for each ring blank or each later finger-ring 2.

Ideally, a ring blank has a uniform thickness over its total length, in order to avoid later steps or shoulders. Should steps or shoulders nevertheless arise e.g. through the chip module 10, said steps or shoulders can be compensated by applying a paste which is e.g. thermally or UV-curing.

After the ring blank has been prepared and singled to a certain desired length in accordance with the above steps, the ring blank is wound or rolled up to obtain the form of a finger-ring 2 with a corresponding diameter and thickness of the finger-ring 2. To form a firm bond, the ring blank is laminated under pressure and heat in a mold into which the rolled ring blank has been inserted.

Alternatively, the ring blank can be wound around a core ring. The core ring has the form e.g. of a finger-ring 2. Further, the core ring has for example a U-shaped cross-sectional profile. The core ring advantageously consists of plastic. Preferably, the core ring is manufactured by an injection-molding or die-casting process.

The finger-ring 2 manufactured according to the above-described method can be a closed ring or an interrupted ring whose ends do not touch.

With the above-described method there can be manufactured external secure units 2 in the form of a finger-ring 2 with different size, without requiring a special adaptation e.g. of the antenna coil 8 to the dimensions of the finger-ring 2.

As an alternative to the above-described method, the external secure unit 2 in the form of a finger-ring 2 can be manufactured by an injection-molding process.

For this purpose, the chip module 10 and the antenna coil 8 and any further electronic devices are arranged on a carrier foil, as described above. The individual ring blanks can be singled out of the carrier foil in different lengths, in order e.g. to roll up the ring blanks in a ring shape. Subsequently, a rolled or non-rolled ring blank can be inserted into an injection mold to overmold the ring blank with a suitable injection-molding material. The material employed for this purpose is e.g. a plastic or a resin. After overmolding there is obtained a ring-shaped body in whose interior the chip module 10 and the antenna coil 8 and any further electronic devices are arranged.

In a further embodiment example, the chip module 10 and the antenna coil 8 are interconnected electroconductively without being arranged on a carrier foil, and subsequently inserted into an injection mold in order to be overmolded. The chip module 10 and the antenna coil 8 are advantageously held in a desired position by means of bars.

After overmolding of chip module 10 and antenna coil 8 and any further electronic devices for manufacturing a ring-shaped body, a foil is applied to the ring-shaped body. The foil can be printed or have e.g. a pattern or a design or an inscription. The foil can be e.g. glued to the ring-shaped body.

Alternatively, the ring-shaped body can be vapor-coated on its surface at least partly with a metallization layer, e.g. with aluminum. As a further embodiment example, the surface can be printed or lacquered.

As a further alternative, there can be applied on the surface of the ring-shaped body at least partly a ring-shaped casing consisting of at least one ring-shaped portion. Advantageously, the casing consists of non-metallic material, e.g. plastic, at least in the region of the antenna coil 8. The casing itself can be manufactured e.g. by a die-casting process.

As an alternative embodiment example, the external secure unit 2 in the form of a finger-ring 2 can be manufactured both from metal and from plastic.

The finger-ring 2 consists for this purpose of at least two components. A first component consists of metal and a second component consists of plastic. The first component consists e.g. of silver, gold, titanium, steel. Optionally, the first component has e.g. a precious stone arranged therein. Preferably, the first component forms an arc element of more than 180 degrees of the finger-ring 2. The second component consists e.g. of PET, PVC, carbon. The second component has arranged therein the chip module 10 and the antenna coil 8 and possibly at least one further electronic device, e.g. a display. The second component consists of at least one constituent. The chip module 10 and the antenna coil 8 and the possibly further electronic devices are arranged on a carrier, as described above. The carrier is preferably inserted into a recess in the second component. Optionally, the carrier can be surrounded with ring-shaped elements, which are manufactured e.g. according to the above-described die-casting process. The carrier can be arranged in the second component replaceably. Alternatively, the carrier can also be connected firmly to the second component, e.g. by means of a glue. The first and the second component have opposite positive and negative structures at their respective ends in order to interconnect the two components.

As a further advantageous embodiment example, the external secure unit 2, e.g. in the form of a finger-ring 2, is personalized. There can be incorporated into the finger-ring 2 for example an outwardly visible, optical personalization and/or an electronic personalization. The data employed for personalization can be for example given name, surname, date of birth, address, photo, account number, bank code number, social security number, insurance number for a user's health insurance scheme, or a serial number of the finger-ring 2. The finger-ring 2 can be personalized during manufacture or after manufacture. In outwardly visible optical personalization, e.g. the user's name or a serial number is incorporated into or applied to the surface of the finger-ring 2 e.g. by high or deep embossing or printing. An outwardly visible optical personalization can be incorporated or applied e.g. by means of a laser, a milling machine, an ink-jet printer, a thermal transfer printer, screen printing or offset printing. In electronic personalization, personalization data are written to the at least one chip module 10 of the finger-ring 2. The personalization data can be written to the chip module 10 either directly via a contact-type connection, e.g. upon the manufacture of the chip module 10 e.g. by means of contact pins, or via a contactless connection, e.g. via the antenna coil 8 connected to the chip module 10, after the chip module 10 has been connected to the antenna coil 8. Outwardly visible optical personalization and electronic personalization can be performed simultaneously or successively. For example, during manufacture of a finger-ring 2 by means of injection molding, personalization data, e.g. an individual embossing, can be incorporated into the finger-ring 2. The personalization data in the form of an individual embossing are subsequently written to the chip module 10. Conversely, it is possible for example that the personalization data are first read out from the chip module 10 e.g. via the antenna coil 8, in order to apply or incorporate the personalization data into or to the finger-ring 2 accordingly during injection molding of the finger-ring 2. For personalization, at least one finger-ring 2 is fastened for example to an axle. The personalization data are applied on the surface of the finger-ring 2 e.g. line by line e.g. by means of a laser or printer. Previously, simultaneously or subsequently, the personalization data are transferred into the chip module 10.

An application example of the external secure unit 2, e.g. in the form of a finger-ring 2, is an encryption of data. The external secure unit 2, e.g. the finger-ring 2, is connected by means of a contactless interface, e.g. an NFC interface, which is formed by the antenna coil 8, to a mobile communication device 4, e.g. a smartphone, via a corresponding interface, e.g. an NFC interface. By means of a further interface the communication device 4 is connected to a communication network, e.g. mobile radio network, this preferably involving a contactless connection with the communication network. Via the communication network a connection can be set up e.g. to other communication networks, e.g. to the Internet. The finger-ring 2 is worn on the user's finger. The finger-ring 2 is able to receive data via the NFC interface or, where applicable, via further interfaces, to encrypt the received data, and subsequently to send the encrypted data back to the communication device 4 either via the same interface or via another interface, e.g. infrared or wireless LAN. Alternatively, the finger-ring 2 can transfer the encrypted data to a further external communication device 4, e.g. a further smartphone, with which the finger-ring 2 has a communication connection. As a further alternative, the finger-ring 2 can transfer the encrypted data to a device, e.g. a server, connected to the communication device 4 e.g. via the Internet. As a further alternative, the finger-ring 2 can transfer the encrypted data to a device, e.g. a server, connected to the communication device 4 via a mobile communication network, e.g. mobile radio network. The files to be encrypted can be e.g. individual files, file folders or data streams as occur e.g. with multimedia applications. The finger-ring 2 can also decrypt encrypted data received from the communication device 4 and send the decrypted data back to the communication device 4 or transfer them to another communication device 4 connected e.g. via Internet. For encryption and decryption the conventional methods are applied, e.g. DES, RSA, ECC. Further, the finger-ring 2 supports methods for secure exchange of keys. The finger-ring 2 contains an ordered list of contact data to other devices, e.g. Ipv4 address, IPv6 address, telephone number, names, addresses, which public keys are employed for an asymmetric encryption, as well as which symmetric keys are used, with the list of contact data being stored in the finger-ring 2. Further, the finger-ring 2 supports a so-called public key infrastructure, abbreviated as PKI. The ordered list of contact data to other devices can be displayed in the communication device 4, e.g. smartphone. Further, the finger-ring 2 contains an optionally protected data memory, e.g. by means of password, which is accessible via the communication device 4, in order e.g. to store confidential data through the user. For utilization of the finger-ring 2 by the communication device 4, e.g. smartphone, it is necessary to execute a corresponding application on the communication device 4. For executing the application, a password query can optionally be effected. The finger-ring 2 can therefore be employed only after previous authentication by the communication device 4, e.g. smartphone. The finger-ring 2 can be employed for encryption and/or decryption only as long as there is a connection, e.g. via NFC, to the communication device 4, e.g. smartphone. Another variant is that the utilization for encryption and decryption has a time limit. A further variant is that the utilization for encryption and decryption of the finger-ring 2 is event-based, i.e. that encryption and decryption is utilized only as long as e.g. there is a telephone connection.

The data encrypted and/or decrypted with the finger-ring 2 can be transferred to, and/or be retrieved from, different data memories that are publicly accessible, where applicable, e.g. cloud memories. Public keys of at least two finger-rings 2 are stored in a central server and can be retrieved from the central server by request of a finger-ring 2, with optional previous authentication of the requesting finger-ring 2. Therefore, a necessary public key is available locally on a finger-ring 2 in order to carry out an encryption with a subsequent transfer of data to at least one other finger-ring 2 or the communication device 4 respectively connected to the other finger-ring 2. An exchange of keys can be restricted to certain user groups. There can thus be obtained a simple and secure data encryption and decryption, with the external secure unit 2, here e.g. the finger-ring 2, being worn on the body, here on the finger.

A further application example of the external secure unit 2, e.g. in the form of a finger-ring 2, is that the external secure unit 2 is able to determine its own position, in order e.g. to safeguard a transaction. For this purpose, there is integrated into the external secure unit 2, e.g. a finger-ring 2, an element for secure position determination. Energy necessary for position determination can be supplied for example by the electromagnetic field of a communication device 4 to which the finger-ring 2 is connected, e.g. via an NFC interface. The element for position determination consists of a chip with a suitable antenna. The element for position determination is connected to the chip module 10. If the chip module 10 is connected to the antenna for position determination, then the position determination can also be performed by the chip module 10. Depending on the application, the accuracy of position determination can vary. The position determination can be based on satellites, as is known e.g. from GPS or Galileo. Alternatively, the position determination can be effected on the basis of data from networks, such as wireless LAN and GSM. Furthermore, a combined position determination involving the above-stated possibilities of position determination based on satellites and that based on network data is possible. Therefore, an independent and secure determination or check of a user's position is possible by means of a secure unit 2 worn on the body, e.g. a finger-ring 2. For example, by comparing a position of the finger-ring 2 and a position of a bank terminal where the user is currently located there can be prevented for example a so-called man-in-the-middle attack.

A further embodiment example of the external secure unit 2, e.g. in the form of a finger-ring 2, is that the finger-ring 2 performs the function of a SIM card. The finger-ring 2 has an application that performs all functions of a SIM card and makes available all required data. The finger-ring 2 transfers the required data via a contactless interface, e.g. an NFC interface, to a communication device 4, e.g. a smartphone, which likewise has a contactless interface, e.g. an NFC interface. The data transfer between finger-ring 2 and communication device 4 is optionally effected in encrypted form. In the communication device 4 there is an application that processes the data from the finger-ring 2 in order to authenticate the communication device 4 e.g. toward a network operator. Alternatively, data can be transferred from the finger-ring 2 directly to a network operator, with the communication device 4 only transferring the data to the network operator but not processing them further. Hereinafter two possible cases of application will be presented. In the first case, the communication device 4, e.g. mobile telephone, contains a SIM card. The communication device 4 queries via e.g. its NFC interface whether a finger-ring 2 is present and whether the latter makes a SIM function available. When a finger-ring 2 with a SIM function is present, then work is continued with the SIM data that the finger-ring 2 makes available, and not with the SIM data that the SIM card already present in the communication device 4 makes available, this being known as a so-called subscription switch. A switch back to the SIM card originally present in the communication device 4 is effected e.g. when a call or a utilization is ended or as soon as the finger-ring 2 is outside the range of the NFC interface of the communication device 4 or until the current application in the communication device 4 is ended or a screen lock or other events adjustable in the communication device 4 become active. In the second case, the communication device 4 contains no SIM card. In this case, the communication device 4 can be employed only when the finger-ring 2 is in the region of the NFC interface of the communication device 4. As long as the finger-ring 2 is in the region of the NFC interface, the employment of the communication device 4 can e.g. have a time limit or be restricted to only a certain application. Further, the employment of the communication device 4 can be restricted e.g. for a certain application until the activation of events in the communication device 4, e.g. the switch-on of a screen lock. For receiving data or calls, the data of the SIM of the finger-ring 2 are stored in the communication device 4, so that a reception of data or calls is also possible without the presence of the finger-ring 2 with a SIM function. However, the data can be opened and processed or the call taken only when the finger-ring 2 with a SIM function is present. The advantage is that costs arising from utilization of a communication device 4 can be assigned to a specific person and accordingly billed, where applicable, by means of the finger-ring 2 with a SIM function.

A further advantageous application example of the external secure unit 2, e.g. in the form of a finger-ring 2, is that an electronic ticket is transferred to the finger-ring 2 via a contactless interface. An electronic ticket, e.g. a flight ticket, generated e.g. by a server or background system is received by a communication device 4 and transferred thereby via a contactless interface, e.g. an NFC interface, to a finger-ring 2. The electronic ticket is stored in the finger-ring 2. In the finger-ring 2 there is located an application that transfers the electronic ticket at a request from outside via a contactless interface, e.g. an NFC interface. The application on the finger-ring 2 simulates e.g. an RFID tag. In an advantageous embodiment, the finger-ring 2 has different kinds of tickets stored therein, e.g. flight ticket, concert ticket, public-transit ticket, with each ticket having its own identifier. The identifier and the appurtenant ticket are transferred jointly to the finger-ring 2. An individual ticket is called up by a reader, by the reader transferring the identifier of the ticket to the finger-ring 2. The finger-ring 2 sends the corresponding ticket to the reader on request by means of the identifier. The identifier is unique to each ticket and is assigned e.g. by the finger-ring 2 itself or by the manufacturer of the finger-ring 2. For example, the identifiers of the tickets in a finger-ring 2 can also be supplemented or changed later by updating data on the finger-ring 2. An electronic ticket can be purchased e.g. at a vending machine with a contactless interface, e.g. an NFC interface, and be transferred to the finger-ring 2 via e.g. the NFC interface. This application example is advantageous in that an electronic ticket is stored on the finger-ring 2 and is therefore available on the finger-ring 2 without a network connection and furthermore can be transferred from the finger-ring 2 to a reader with a suitable contactless interface.

In a further application example of the external secure unit 2, e.g. in the form of a finger-ring 2, the function of a card for applications for payment is transferred to the external secure unit 2, e.g. the finger-ring 2. Further, an application for payment can be safeguarded by the external secure unit 2, e.g. the finger-ring 2, with the external secure unit 2 being separate from a mobile communication device 4, e.g. mobile telephone, with which the external secure unit 2 can communicate e.g. via a contactless interface. Preferably, there is employed a finger-ring 2 having at least one contactless interface and having a function for payment applications. A plurality of so-called banking or payment applications can be executed by the finger-ring 2. The individual applications are selected via so-called application identifiers, abbreviated as AIDs. The individual applications can be stored e.g. by a manufacturer or provider of the finger-ring 2 on the latter, or a user can download the desired application via a so-called app store. The connection to an app store can be established e.g. via a mobile communication device 4 with which the finger-ring 2 is connected via e.g. an NFC interface. If the finger-ring 2 has at least two applications for payment stored therein, then a preferred application for payment can be specified when e.g. the finger-ring 2 is not connected to the communication device 4 via e.g. an NFC interface or it is not possible to select an application for payment via a selection menu. If the finger-ring 2 is used e.g. alone without a communication device 4 at an automatic teller machine, then either the preferred application is employed or the applications available on the finger-ring 2 are displayed on a display of the automatic teller machine, with the application to be employed being selectable via the automatic teller machine. Optionally, a PIN or password query takes place after the selection of an application. This may involve e.g. a uniform PIN for the finger-ring 2 or an application-specific PIN. During the employment of applications for payment, the employment of other applications can be prevented or restricted in the finger-ring 2 for security reasons. For example, only certain applications can be employed in a restricted manner during the employment of an application for payment. At least one application for payment can generate a one-time password, abbreviated as OTP, or a transaction number, abbreviated as TAN, which is employed for payment. For employment of the finger-ring 2 for applications for payment, there must be started on the appurtenant communication device 4 communicating with the finger-ring 2 via a contactless interface, e.g. NFC, a suitable application which sets up a communication connection with the finger-ring 2 via the contactless interface. Optionally, a password query can be effected upon starting of the application on the communication device 4. After a communication connection is set up between finger-ring 2 and communication device 4, all applications for payment present on the finger-ring 2 are displayed for selection on a display of the communication device 4. No security-relevant data, such as a user's personal data or data relating to a bank, are stored in the communication device 4. The application on the communication device 4 for setting up a communication connection with the finger-ring 2 is executed either for a limited time or only as long as the finger-ring 2 is located in the reading range of the communication device 4. The application in the communication device 4 for setting up a communication connection with the finger-ring 2 can be tied to a certain finger-ring 2, by e.g. checking an identification number of the finger-ring 2, a serial number of the chip of the finger-ring 2 or an application identifier of an application before the start of the application. Further, it can be specified that an application for payment that is stored on the finger-ring 2 is executed only in connection with a certain communication device 4, e.g. mobile telephone, which authenticates itself e.g. by means of its International Mobile Station Equipment Identity, abbreviated as IMEI. This application example is advantageous in that it enables secure and simple payment by means of the finger-ring 2.

A further application example of the external secure unit 2 in the form e.g. of a finger-ring 2 is to check the age of a user of the finger-ring 2. In a memory of the finger-ring 2 worn e.g. on the body, the user's date of birth is for example stored upon personalization of the finger-ring 2 and additionally confirmed by means of a signature e.g. by a body issuing the finger-ring 2, e.g. a manufacturer of the finger-ring 2. The age of the user of the finger-ring 2 can be queried when needed, e.g. to release certain applications or services requiring age verification. The query is effected e.g. via a contactless interface, e.g. an NFC interface, of the finger-ring 2. The finger-ring 2 can output as an output value e.g. a real age or the date of birth, or it can also output whether a person is older than a certain age, e.g. whether a user is older than 18. The check of a user's age can be employed e.g. on cigarette machines or on the Internet. At the beginning of a method for checking a user's age with finger-ring 2 an authentication takes place between a communication device 4, e.g. a server, mobile telephone or terminal, and the finger-ring 2 e.g. by means of a contactless communication, e.g. according to NFC. Subsequently, the communication device 4 queries the user's age. The query can be so constructed that it contains particulars about the application identifier of the querying application, the date of birth to be queried or whether the user is older than a certain age, possibly a first random value, an identification number of the terminal and a signature. A response of the finger-ring 2 can be for example so constructed that it consists of an XOR operation, consisting of the first random value and the age, and, where applicable, of an identification number of the finger-ring 2 and a signature. After receiving the response of the finger-ring 2 the communication device 4 can compute the user's age and accordingly e.g. release a desired service. Alternatively, the check of age can also be effected by means of a central computer e.g. via Internet, with a user's age being determined by means e.g. of an identification number of the finger-ring 2. Further, the determination of age can also be carried out directly by the finger-ring 2, so that the finger-ring only transfers a result to a communication device 4. This application example is advantageous in that it involves a secure and always available age verification for e.g. services on the Internet or on machines.

A further application example of the external secure unit 2, e.g. in the form of a finger-ring 2, is to employ the finger-ring 2 as a passport document or identity document. The finger-ring 2 as a passport document or identity document can be employed instead of or in addition to a conventional passport document or identity document. Besides personal data, such as name, address, photo, there can also be stored on the finger-ring 2 or in its memory e.g. biometric data. In dependence on different access rights for e.g. government agencies such as the police of different nations, an access to different stored data can be arranged. Requested data are transferred for example via an NFC interface of the finger-ring 2. Further, at least one visa can also be stored in the memory of the finger-ring 2. A visa can be retrieved from the memory of the finger-ring 2 with a suitable application. The application necessary therefor can be an internationally uniform application or a country-specific application. The visa is written to the memory of the finger-ring 2 e.g. via a contactless interface of the finger-ring 2. Thus, the visa is transferred from a server via a mobile network, e.g. mobile radio network, to a communication device 4 which transfers the visa to the finger-ring 2 via e.g. an NFC connection. Alternatively, the visa can also be transferred to the finger-ring 2 directly via e.g. an NFC connection, when e.g. the finger-ring 2 is located in a reading range of a corresponding server. The visa can be personalized on the same path as it was transferred to the finger-ring 2. As an alternative to a hitherto customary passport document or identity document, a corresponding finger-ring 2 can be manufactured as a copy or as an additional issue of the passport document or identity document. As soon as the data on the finger-ring 2, e.g. data of a passport document or identity document or of a visa, are confirmed by an issuing body, e.g. public agency that issues identity documents, the finger-ring 2 with the data can be issued to a user. The transfer of data to the finger-ring 2 can be effected e.g. from a server via a mobile radio network to the communication device 4 and from the communication device 4 via an e.g. NFC interface to the finger-ring 2. Alternatively, the data to be transferred can be transferred from a terminal to the finger-ring 2 directly via e.g. an NFC interface. The personalization of the transferred data is effected as described above, e.g. via a mobile radio network or directly on a terminal. Besides data stored directly in the finger-ring 2, the data can e.g. also be stored as a link to a secure memory on the Internet, the so-called cloud, for accelerating an output or display. The data between finger-ring 2 and the secure memory on the Internet must be synchronized, where applicable, or a comparison of e.g. hash values can confirm the accuracy of data to be displayed.

A further application example of the external secure unit 2 in e.g. the form as a finger-ring 2 is to generate random numbers in order that e.g. a user of the finger-ring 2 can take part as a participant in a game of chance. For this purpose, the finger-ring 2 has a random number generator arranged therein. The length of the generated random numbers can be adapted as pre-specified and is variable. The generated random number can consist of a plurality of digits and optionally be generated digit by digit. The generation of a random number is started at the request of a user by means of an application arranged in a communication device 4, e.g. mobile telephone, with the communication device 4 being connected to the finger-ring 2 via a contactless interface, e.g. an NFC interface. The execution of the application for generating a random number can optionally be connected to a payment function, so that a fee is to be paid for each generated random number. A generated random number can be transferred from the finger-ring 2 e.g. via the communication device 4 to a server, whereby a server can receive random numbers generated by a plurality of finger-rings 2. Secure connections are employed for the transfer between finger-ring 2 and communication device 4 or between communication device 4 and server. The server has e.g. itself an external secure unit 2 associated therewith, which generates e.g. a master random number. The external secure unit 2 generates the master random number in dependence on a pre-specified time duration, e.g. once a day or once a week, or in dependence on the number of participants respectively sending random numbers to the server. The random numbers received by the server are respectively compared with the master random number. In case of a match of a received random number with the master random number, the corresponding participant makes a win. The participant is informed of his win e.g. by means of an application on the communication device 4.

A further application example of the external secure unit 2, e.g. in the form of a finger-ring 2, is to authenticate the finger-ring 2 or its user toward a communication device 4, such as a terminal or a keyboard. As described above, the finger-ring 2 has at least one chip module 10 and an antenna coil 8 as a contactless interface. As soon as the finger-ring 2 is located in a reading range of the communication device 4, a communication connection, e.g. an NFC connection, is set up between the finger-ring 2 and the communication device 4, in order that e.g. the finger-ring 2 can authenticate itself toward the communication device 4. To set up as good a communication connection as possible, a contactless interface of the communication device 4 must be so configured that the finger-ring 2 is recognized fast and reliably in every position if possible. For this purpose it is advantageous when the communication device 4 has a ring-shaped antenna coil 8 which is laid e.g. along the housing, e.g. of a keyboard. Further, at least two antennas, e.g. in the form of a ring or a toroid, can be so linked in the communication device 4 that the communication connection with the finger-ring 2 is set up fast and reliably. Advantageously, the at least two antennas can be arranged under a keyboard of the communication device 4, so that e.g. the communication device 4 is locked as soon as it is recognized that the finger-ring 2 has left the reading range of the communication device 4. As an alternative to the above-mentioned antenna forms, there can also be employed so-called Helmholtz coils, in order to obtain e.g. a uniform electromagnetic field. Furthermore, arbitrary other suitable antenna forms, antenna combinations and coupling positions are possible. The finger-ring 2 is supplied with energy via the electromagnetic field of the at least one antenna coil. As a communication protocol there can be employed e.g. NFC, wireless LAN, Bluetooth or any other suitable protocol, in particular contactless communication protocol. It is advantageous that a user is easily recognized as soon as the user's finger-ring 2 is located in the reading range of the communication device 4 and thus authenticates itself toward the communication device 4.

A further advantageous embodiment example of an external secure unit 2, e.g. in the form of an M2M module for vehicles, is to integrate a contactless interface, e.g. an NFC interface, for reading and writing data on an M2M module. Besides the conventional ISO-7816 contacts of an M2M module, the antenna contacts e.g. LA and LB are to be guided outside via the ISO contacts C4 and C8 of a corresponding dual interface chip. There are then to be attached to the module contacts C4 and C8 e.g. an NFC antenna. The NFC antenna can be realized for example as part of a circuit on a circuit board e.g. of a GSM modem. Optionally, the range of the antenna or possible line losses can also be increased, where applicable, by means of an amplifier circuit or a circuit for active load modulation. Optionally, a circuit can be integrated for protection from excess voltage which can e.g. come from a reader. Optionally, the NFC antenna can be realized as an external antenna and lie outside the housing of the M2M module. In this case, the antenna is preferably attached e.g. by means of a line to corresponding contacts of the M2M module. For vehicles, the antenna can be arranged e.g. on the inner side of the windshield, without the M2M module having to be arranged on the windshield. For an intelligent meter for energy, a so-called smart meter, for e.g. electricity or gas, the antenna can be mounted e.g. at an externally accessible position of the meter housing or be connected via a line to an external antenna which is located e.g. in an apartment, with the smart meter being located e.g. in the basement. It is advantageous that M2M modules with an alternative interface, e.g. an NFC interface, are made available which enable a contactless readout of data from the M2M module or the communication therewith.

A further application example of the external secure unit 2 is to employ the external secure unit 2 as an electronic vehicle registration document. Advantageously, the electronic vehicle registration document can be managed remotely. The external secure unit 2 is thus for example a so-called M2M module which is arranged e.g. in a vehicle. As discussed above, a contactless connection, e.g. an NFC connection, can be set up between the M2M module and a communication device 4, e.g. a mobile telephone or a PC or a notebook, having access to a mobile radio network or to the Internet. Between the communication device 4 and a server or background system there is likewise a communication connection e.g. via a mobile radio network or via the Internet. Optionally, a secure connection can be set up e.g. between the server and the M2M module in the vehicle, whereby the vehicle must have a suitable communication device which establishes a connection between server and M2M module. The secure connection can be established e.g. by means of an MSISDN or IPv6 associated with the vehicle and, where applicable, in combination with cryptologic keys. The key is e.g. present on the M2M module and can be employed e.g. by a registration office, after successful authentication, in order to change the data of the vehicle registration document. The memory of the M2M module can be accessed both for writing and for reading. If the M2M module is e.g. to be personalized, there can be employed e.g. a trusted service manager, abbreviated as TSM. Before accessing the memory of the M2M module, e.g. the server of a registration office must first authenticate itself, in order e.g. to change the data of the vehicle registration document in the M2M module accordingly in the case of a registration or a change of registration of the vehicle. Thus, for checking the vehicle, data about the vehicle are e.g. first read out from the memory of the M2M module. Data about the vehicle can be e.g. its type, date of manufacture, performance, engine type, gearshift, color, tires, any signature of an entity carrying out the personalization of the M2M module, e.g. a TSM for example upon manufacture of the vehicle. Subsequently, after a successful check of the vehicle, registration-specific data are stored by the server of the registration office to the M2M module arranged in the vehicle. Registration-specific data can be e.g. a registration number, registration date, registration office, inspection, exhaust emission test values, insurance data or an electronic signature of a registration office. The previous vehicle registration document can optionally be additionally issued as a paper document or as an electronic vehicle registration document e.g. in the form of a smart card. In a further advantageous embodiment example, there is the possibility of reading out the data of the vehicle registration document from the M2M module by means e.g. of an NFC connection. For this purpose the M2M module can optionally have an NFC antenna. The quantity of read out data can be made dependent on an authentication of a reading-out device. For example, the police can employ communication devices 4 that authenticate themselves toward the M2M module in order to read out all the data of the vehicle registration document at the vehicle, with the communication device 4 of the police being located outside the vehicle. If the data of the M2M module are read out without authentication, only the registration number can e.g. be outputted, i.e. no person-specific data are outputted. An electronic vehicle registration document in the manner represented above is advantageous in that the electronic vehicle registration document can be changed remotely by e.g. a registration office. Further, the police can e.g. read out the data of the vehicle registration document directly at the vehicle even in the absence of a driver.

A further application example of an external secure unit 2 in the form of an M2M module in a vehicle is to use the M2M module for an electronic parking slip or for writing and reading an electronic parking slip to or from the M2M module. As described above, the M2M module is connected by means e.g. of an NFC interface to a communication device 4, e.g. a mobile telephone or a terminal. By means of an application on the communication device 4 there can be created e.g. for a selectable vehicle for a certain location within a certain time an electronic parking slip, which is stored in the M2M module. The location can be e.g. a current or a selectable location, e.g. by means of GPS. The vehicle can be selected e.g. by means of license plate number. The application in the communication device 4 sends the above-stated data via a communication connection, e.g. via a mobile radio network, e.g. to a server, which processes the data with regard to the parking slip. After processing and payment, the server sends the electronic parking slip back to the communication device 4. The communication device 4 stores the parking slip in the M2M module. Where applicable, a confirmation that the parking slip has been paid for and received appears on a display of the communication device 4. Payment can be effected via the communication device 4 e.g. by means of a credit card or other mobile payment functions. The requesting of a parking slip can also be effected remotely, by an e.g. current or future position of the vehicle, where applicable, being queried e.g. by means of GSM or GPS by the communication device 4 e.g. at the prompting of the M2M module or the user, or being inputted by a user, or being accordingly selected in a displayed menu of the communication device 4, or also without requesting exact location information. The requesting of a parking slip can also be effected with a time shift, by a validity, e.g. a starting time or a certain parking duration, being selected by means of a display of the communication device 4. Optionally, the parking duration can be represented optically on a display of the communication device 4. Before the parking duration expires, a reminder can optionally be effected on the display of the communication device 4. A validity of an existing parking slip can be extended by additional payment, by the existing parking slip being replaced by a new parking slip. In the M2M module at least one parking slip can be stored. A readout of a parking slip from outside the vehicle is effected by means e.g. of an NFC interface of a communication device 4. The communication device 4 with an NFC interface e.g. of the police reads out the parking slip stored in the M2M module and checks its validity. If no valid parking slip is present in the M2M module, an electronic violation ticket can e.g. be generated directly on site and stored in the M2M module. Optionally, the electronic violation ticket can be transferred from the M2M module to the driver's communication device 4. The parking slip can be for example an electronically signed file created by a signature key of a server of an issuing office for parking slips and containing information e.g. on the vehicle, location and time. Upon readout of the parking slip the signature can accordingly be easily checked, provided a corresponding public signature key is present with the reader. It is advantageous that this is a simply implemented method for electronic parking slips, whereby at least one parking slip can optionally be transferred to a vehicle remotely and can be read out at the vehicle e.g. by means of an NFC connection by e.g. the police.

A further application example of an external secure unit 2, e.g. a finger-ring 2, is to check a valid driving license and a valid vehicle insurance and personal restrictions. In an external secure unit 2 e.g. in the form of an above-described finger-ring 2, there is stored a file containing information about the driving license and about the vehicle insurance of the user of the finger-ring 2. The file is created or changed by a trustworthy entity, e.g. TSM, or a government agency. Data of the file can only be written or changed after previous authentication and checking of write permissions. The file protected from unauthorized access can contain e.g. particulars about the user of the finger-ring 2, his driving license and his insurance. As particulars about the user there are stored e.g. surname, given name, birth name, place of residence. As particulars about the driving license there are stored e.g. the driving-license classes, date when the individual driving licenses were acquired, issuing agency, possible restrictions and any time-restricted validity of a driving-license class. As particulars about the insurance there are stored e.g. vehicle classes with liability insurance or fully comprehensive insurance, insurance cover e.g. for the value of a vehicle, performance restrictions, e.g. up to 100 horsepower, speed limits, e.g. up to 120 km/h or, where applicable, time restrictions, e.g. driving is only allowed between 10.00 a.m. and 5.00 p.m. because of a lower accident risk. Optionally, the file is updated regularly, e.g. once a month, in order to record changes e.g. of the driving license or the insurance cover. This can be effected e.g. in an automated manner, as soon as the finger-ring 2 is connected e.g. by means of an NFC connection with a communication device 4, e.g. a mobile telephone, via e.g. the Internet with an entity managing the data, e.g. a TSM. The file stored in the finger-ring 2 is read out and evaluated e.g. via an NFC interface upon employment of a vehicle. Utilization of the vehicle is prevented, by e.g. the engine not being startable, if there is e.g. no valid driving license for the vehicle class or no valid insurance corresponding to the vehicle. For this purpose, the data of the vehicle that are stored e.g. in an M2M module of the vehicle are compared with the data of the driver's finger-ring 2 and evaluated. The insurance cover is to be adapted to the actually employed vehicle, known as "pay as you drive". For this purpose, the data of the employed vehicle, as well as the duration of a trip, where applicable, are recorded in a file in the finger-ring 2 and later sent for accounting to an insurance company as soon as the finger-ring 2 is e.g. connected to the Internet by means of the communication device 4. The recording and transmitting of data to the insurance company can also be done by means of the M2M module arranged in the vehicle, with this also necessitating a connection with a communication device 4. The vehicle can nevertheless be employed in case of emergency, but there is a corresponding display in the vehicle. For drivers with a restricted driving license, e.g. driving novices or drivers under 18 years of age, the vehicle engine can only be started when a second person as a front-seat passenger has been identified as a front-seat passenger via his finger-ring 2. Advantageously, the front-seat passenger is queried automatically if a restriction has been recognized by means of the driver's finger-ring 2. The file in the finger-ring 2 optionally has an entry regarding traffic offenses. Depending on this entry, specific restrictions can hold, e.g. a maximum speed of 100 km/h must be observed for four weeks. A change of engine power is effected e.g. by means of a vehicle control which is controlled e.g. via the M2M module arranged in the vehicle. It is advantageous that the insurance is adapted to the current circumstances, e.g. the current vehicle. Further, a person-specific or vehicle-specific anti-theft device can be set up.

A further advantageous application example of the external secure unit 2, e.g. in the form of a finger-ring 2, is employment as a vehicle key whose programming can be changed via a contactless interface. A vehicle is equipped e.g. in a door or in the steering wheel with a communication device 4, e.g. a reader for an NFC connection, with the communication device 4 enabling a detecting and authenticating of the finger-ring 2. Advantageously, a plurality of different finger-rings 2 for employment of the vehicle can be released for e.g. an owner of the vehicle and its users. The finger-ring 2 and the at least one communication device 4 contain applications that are employed for authentication between finger-ring 2 and vehicle. The communication device 4 can itself contain an external secure unit 2, e.g. in the form of a SIM card, or be connected via a contactless communication connection, e.g. an NFC connection, to an M2M module which is arranged in the vehicle, or the communication device 4 can further e.g. be connected to a server via a mobile radio network and the Internet. The M2M module and/or the SIM card of the communication device 4 can e.g. be updated remotely via a mobile radio network. An update can be carried out for example through a manufacturer of the communication device 4 or of the M2M module or through an entity authorized by a manufacturer, e.g. a TSM. In the vehicle an M2M module can e.g. be arranged in order to generate random numbers for an encryption method, and to check digital signatures, e.g. for an RSA signing method. In the M2M module there is further a memory for a list of public signature keys, which can e.g. be updated via a mobile radio network. The finger-ring 2 has corresponding applications including a signature function and corresponding private and public keys, which are optionally associated with the application and can therefore not be employed by other applications. The validity of the keys can have a time limit. For activating a function, the vehicle sends for example an application identifier AID and a random number and an optional signature to the finger-ring 2. In this case the finger-ring 2 must know the public signature key or have previously received it from the communication device 4. The finger-ring 2 starts an application in accordance with the AID and computes a signature by means of the random number. The finger-ring 2 sends the signature back to the vehicle's communication device 4. By means of the vehicle's communication device 4 the correct signature is checked on the basis of the public key of the finger-ring 2, with the public key being stored in the list of the vehicle's communication device 4. In accordance with the check, a function is released or activated, e.g. open or lock door or start engine. Alternatively, the function is blocked, this possibly increasing in time with the number of attempts, or rejected if the key is not contained in the list. In particular the function "start engine" is to be activated only after a release code has been outputted to an engine control e.g. by the vehicle's M2M module in order e.g. to deactivate an electronic anti-theft device. Advantageously, the response must be given by the finger-ring 2 within a certain time, e.g. two seconds. The finger-ring 2 with a corresponding signature key of the vehicle owner and at least one further finger-ring 2, where applicable, are contained in the list as users without a time limit. In addition, there is the possibility of enabling an employment of a key or an employment of the vehicle only for a certain time. The at least one public signature key which is stored e.g. in the list in the vehicle's M2M module is assigned a validity period. The access to the vehicle is granted only within the validity period. After this period expires the signature key is e.g. deleted. The query of the validity period is effected via the M2M module contained in the vehicle. Further, management can also be effected remotely e.g. via the communication device 4. For this purpose, a user of the finger-ring 2 identifies himself by means of the communication device 4. The user's public signature key is transferred to the M2M module arranged in the vehicle e.g. by SMS, with a time limit, where applicable. The public signature key is signed with a signature key of the vehicle owner, e.g. as a master. A change of the list can only be carried out by the vehicle owner or owners or master or masters specified in the list of the M2M module. A master can be stated e.g. by a further flag in the list, which e.g. cannot be remotely changed. The master can e.g. be pre-specified only by a manufacturer of the vehicle. The flag can state e.g. with the value 1 that a master with an administrator function is involved. The value 0 states that a slave with only user rights is involved. Optionally, a release or administration of the users can only be effected in connection with an electronic vehicle registration document, which is e.g. transferred by NFC interface,. In this case, the vehicle registration document must be present upon execution of the application provided for administration, i.e. an authentication takes place between the vehicle registration document and the application. It is advantageous that an individual release of a utilization of vehicles is given a time limit, without a physical key being present.

LIST OF REFERENCE SIGNS

2 External secure unit, e.g. in the form of a finger-ring
4 Communication device with contactless interface, e.g. a smartphone or a terminal with NFC interface
6 Communication connection between external secure unit and communication device
8 Antenna coil
10 Chip module
12 Inlay, e.g. with chip module and antenna coil
14 Cover
16 Ring half
18 Ring half

The invention claimed is:

1. A method for operating an external secure unit, in which the external secure unit comprises at least the following:
an antenna coil configured to operate at a first frequency; a
memory for storing data;
a chip module including a processor for processing the data, the chip module further including a second antenna coil configure to operate at a second, different frequency, wherein the chip module is electro-conductively connected to the first antenna coil, and wherein the antenna coil and the second antenna coil are positioned orthogonally to each other, allowing the chip module to select which antenna coil has an optimal coupling position relative to a reader, and to implement the selected antennal coil to transmit or receive data; and
one or more interfaces disposed on the external secure unit for receiving data from a communication device or sending data thereto, wherein at least one of the one or more interfaces is not supported by the communication device, wherein the at least one interface not supported by the communication device allows the communication device to communicate through the interface not supported by the communication device to other communication devices that have the interface not supported by the communication device;
wherein the communication device comprises at least:
a memory for storing at least one application program;
a processor for processing and executing the application program;
at least a first interface for sending data to the external secure unit or receiving them therefrom; and
at least a second interface for sending data to a transmission network or receiving them therefrom;
wherein security-relevant data necessary for executing the application program in the communication device are stored in the external secure unit, and the communication device requests the security-relevant data from the external secure unit for executing the application program.

2. The method according to claim 1, wherein at least one application program is assigned a security level in dependence on its application.

3. The method according to claim 1, wherein data are transferred contactlessly between the communication device and the external secure unit.

4. The method according to claim 3, wherein the external secure unit employs as an interface a near field communication (NFC) interface for communication with the communication device.

5. The method according to claim 1, wherein the external secure unit employs two- and/or three-dimensionally arranged antennas for communication with the communication device.

6. The method according to claim 1, wherein the external secure unit employs a sensor for capturing biometric features.

7. The method according to claim 1, wherein as an external secure unit there is employed a finger-ring which consists of at least two components, with an electronic component being inserted into at least one component.

8. The method according to claim 7, wherein the finger-ring consists of a strip-shaped material, with the material being shaped into a ring.

9. The method according to claim 7, wherein a near field communication (NFC) module is inserted into the ring, with the NFC module being replaceable.

10. The method according to claim 1, wherein a mobile telephone is employed as a communication device.

11. The method according to claim 1, wherein a mobile radio network is employed as a transmission system.

12. An external secure unit, comprising the following:
an antenna coil configured to operate at a first frequency;
a memory for storing data;
a processor for processing the data;
a second antenna coil configure to operate at a second, different frequency, wherein the antenna coil and the second antenna coil are positioned orthogonally to each other, allowing the processor to select which antenna coil has an optimal coupling position relative to a reader, and to implement the selected antenna coil to transmit or receive data; and
one or more interfaces disposed on the external secure unit for receiving data from a communication device or sending data thereto, wherein at least one of the one or more interfaces is not supported by the communication device, wherein the at least one interface not supported by the communication device allows the communication device to communicate through the interface not supported by the communication device to other communication devices that have the interface not supported by the communication device, the communication device including:
- a memory for storing at least one application program;
- a processor for processing and executing the application program;
- at least a first interface for sending data to the external secure unit or receiving them therefrom; and
- at least a second interface for sending data to a transmission network or receiving them therefrom;

wherein security-relevant data necessary for executing the application program in the communication device are stored in the external secure unit, and the communication device requests the security-relevant data from the external secure unit for executing the application program.

13. A system comprising:
an external secure unit that includes the following:
- an antenna coil configured to operate at a first frequency;
- a memory for storing data;
- a processor for processing the data;
- a second antenna coil configure to operate at a second, different frequency, wherein the antenna coil and the second antenna coil are positioned orthogonally to each other, allowing the processor to select which antenna coil has an optimal coupling position relative to a reader, and to implement the selected antennal coil to transmit or receive data; and
- one or more interfaces disposed on the external secure unit for receiving data from a communication device or sending data thereto, wherein at least one of the one or more interfaces is not supported by the communication device, wherein the at least one interface not supported by the communication device allows the communication device to communicate through the interface not supported by the communication device to other communication devices that have the interface not supported by the communication device; and the communication device which includes the following:
- a memory for storing at least one application program;
- a processor for processing and executing the application program;
- at least a first interface for sending data to the external secure unit or receiving them therefrom; and
- at least a second interface for sending data to a transmission network or receiving them therefrom;

wherein security-relevant data necessary for executing the application program in the communication device are stored in the external secure unit, and the communication device requests the security-relevant data from the external secure unit for executing the application program.

14. The system according to claim 13, wherein a mobile telephone is employed as a communication device.

* * * * *